Sept. 23, 1969  W. M. HARRISON  3,468,393
AIR CUSHION TRANSPORTING SYSTEM FOR HEAVY DUTY PALLET
Filed May 26, 1967  3 Sheets-Sheet 1
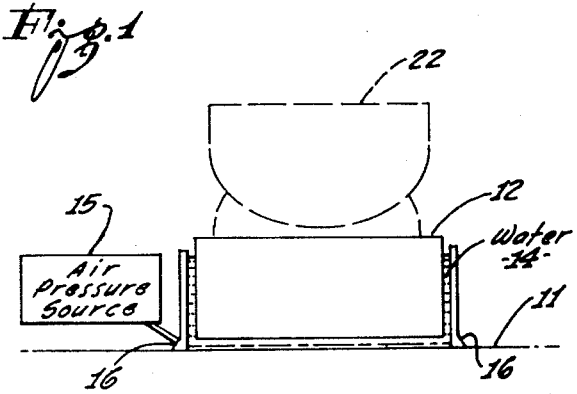
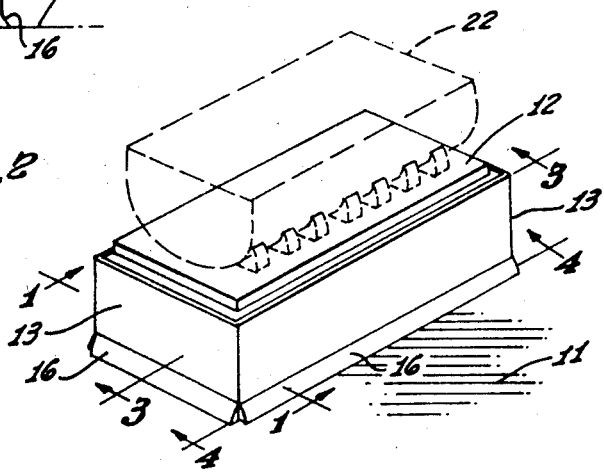
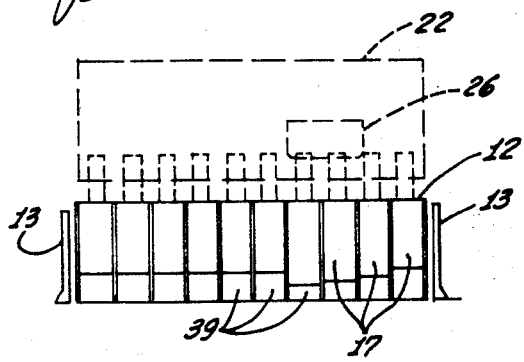
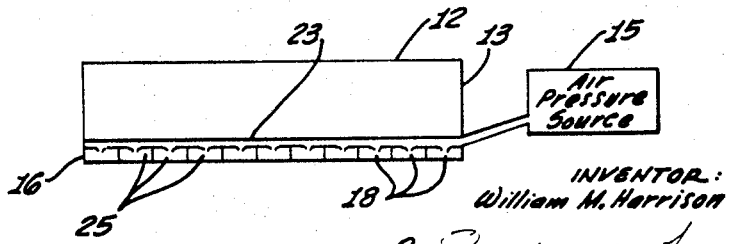
INVENTOR:
William M. Harrison
ATTORNEY

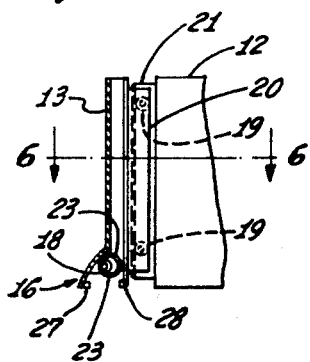
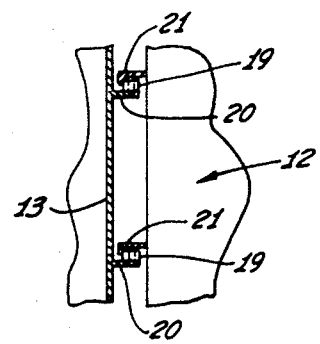
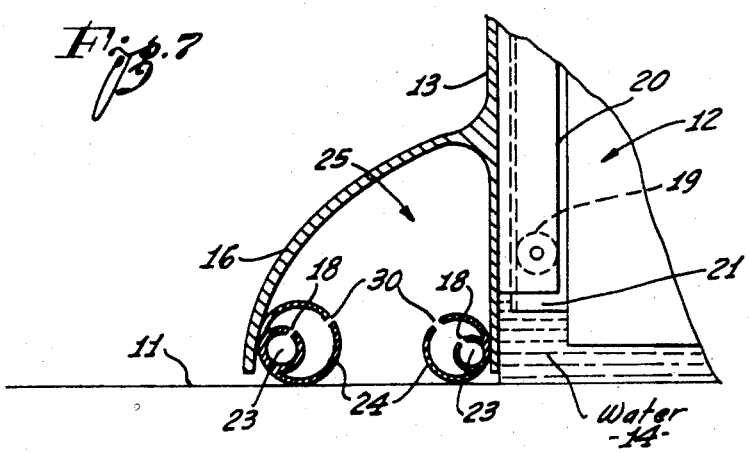

Sept. 23, 1969 W. M. HARRISON 3,468,393
AIR CUSHION TRANSPORTING SYSTEM FOR HEAVY DUTY PALLET
Filed May 26, 1967 3 Sheets-Sheet 3

INVENTOR:
William M. Harrison
ATTORNEY

United States Patent Office 3,468,393
Patented Sept. 23, 1969

3,468,393
AIR CUSHION TRANSPORTING SYSTEM FOR
HEAVY DUTY PALLET
William M. Harrison, 6937 Essex Ave.,
Springfield, Va. 22150
Filed May 26, 1967, Ser. No. 641,558
Int. Cl. B60n 1/00; B63c 1/02; B63b 43/06
U.S. Cl. 180—116                                    8 Claims

ABSTRACT OF THE DISCLOSURE

An article handling and transporting system capable of transporting large objects over a surface by hydrofloatation of the objects including a floatable pallet to support the object and a peripheral curtain wall about the pallet and object for containing the floatation fluid and being sealed about its base with respect to the surface.

---

This invention relates to a method of transporting large objects and more particularly to a heavy duty transportation pallet which is operated by means of a hydropneumatic combination. Pallets are used in handling and transporting objects and merchandise to facilitate handling and to prevent damaging the object being handled. The pallet concept has many inherent advantages in that it permits standardizing load sizes and material handling equipment.

One factor which limits the application of the pallet concept, however, is the ability to handle large pallets once they are very heavily loaded.

The most common method for handling pallets are by the use of fork-lift trucks or cranes. In recent years a number of cargo handling devices have been developed which are supported and made mobile by the use of mechanisms utilizing the ground effects principle. All of the prior art methods of handling large objects have drawbacks which limit the usefulness of the handling means.

Some of the prior art methods of handling large objects require large superstructures to support the lifting means, for example cranes require expensive overhead carriages and related equipment which limits the area and loads which the cranes may handle. To date no means of handling large objects has been designed which is economical to construct, operable outside of the confines of a fixed superstructure, and capable of handling extremely large or massive objects.

Other prior art methods of handling large objects require special accessories for attachment to the lifting means. These special grappling means or lift points add to the cost of the object and are useless for other than handling the object. It is desirable to have means for handling large objects which require no special handling attachments which would be cheaper than those now available.

Some methods previously used to handle large objects generate buckling forces which could damage the object being handled, especially if the object being handled is relatively long in comparison with its height. Buckling forces are the result of the difference between the lifting forces and the actual mass distribution over the length of the object. To eliminate the buckling forces entirely, handling means must be capable of generating lifting forces comparable to the mass distribution of the object (i.e., the opposing forces).

Other prior art methods require excessive power to move the object once it is supported by the conveying means. Usually this is because large and massive objects require very large bearings which are too expensive.

Small, inefficient bearings are used which require excessive power to move the object. Since power expenditure is a measure of work and, ultimately, cost, any useful method should use the minimum power for a given load capacity.

Other prior art methods require special support surfaces such as rails with support pilings (ways). Support means for highly concentrated loads are costly since they must be driven to a depth where substrata of sufficient strength is reached or the surface itself must be reinforced sufficiently to distribute the force over a large area. In such cases, the transportation of the large objects is restricted to the specially prepared areas. It is desirable to have a means of transporting large objects which requires little or no special preparation of the support surface.

Many of the prior art methods of handling large objects require structures which obstruct the construction area. These structures may impede production, and thereby add to the delivered cost of the object. It is desirable to have a transportation means which does not interfere with the work area.

Several of the prior art methods of handling large objects are only suitable for movement over a fixed path. Methods utilizing rails, ways or canals are restricted to movement along a predetermined path. Objects being transported by these means are restricted to single file progression unless a system of sidings or similar means are employed to provide random access. It is desirable to provide a means of transporting large objects which is capable of omnidirectional movement.

It is an object of this invention to provide a means of transporting large objects with minimum structural requirements for a given object size.

It is a further object of this invention to provide a means of handling large objects without the necessity of providing grappling means.

It is a further object of this invention to provide a means of handling large objects which minimizes the buickling forces on the object.

It is a further object of this invention to provide a means of handling large objects wherein minimum power is required to move the object.

It is an additional object of this invention to provide a means of handling large objects wherein minimum special preparation of the support surface is required.

It is still another object of this invention to provide transportation means for large objects which cause minimum interference with the work area.

Another object of this invention is to provide a means of handling large objects which is capable of omnidirectional movement.

The hydro-pallet is a unique device for moving heavy loads over relatively non-porous surfaces. The concept consists of the load being placed on a pallet which floats in a contained body of water. The water is contained by a curtain wall attached to the pallet in a manner that allows no relative motion in the horizontal direction and complete freedom of the pallet to move with respect to the curtain wall in the vertical direction. The curtain wall has a seal around its base to prevent leakage of the water. The floating pallet, curtain wall, and water are free to move as a unit in a horizontal direction when force is applied.

In a preferred embodiment of the present invention the pallet is formed of steel which is divided into numerous watertight compartments. These compartments may be flooded to give the desired buoyant characteristics to the pallet, thus ballasting the loaded pallet to a level or other desired condition.

The pallet is surrounded with a curtain wall which may be constructed of steel, wood, or other suitable materials. The curtain wall is water tight and has seals between its base and the supporting surface. The curtain wall is parallel to the edges of the pallet and is linked to the pallet by a number of roller bearings which allow free vertical movement but restrain the wall from lateral movement relative to the pallet. Water is introduced into the area between the curtain wall and the pallet. As the water level increases the pallet and its supported load will begin to float.

If the pallet is properly ballasted it will float parallel to the supporting surface.

When the water is of sufficient depth to float the pallet-load assembly, the curtain wall will be raised slightly and the entire curtain-wall pallet load assembly may be moved in any desired direction by the application of a relatively small force.

Water is prevented from escaping when the curtain wall is elevated by the introduction of air pressure at the base of the curtain wall which is slightly in excess of the water pressure at the base of the curtain wall.

The curtain wall is provided with an air chamber at its base. This air chamber is divided into many compartments. Each compartment is equipped with air-flow regulating means. The wall is elevated by introducing air pressure into the chambers at the base of the wall. When the pressure at the base of the wall becomes sufficient to exceed the force per unit area due to the weight of the curtain wall, the wall will rise slightly, and be completely supported by the air pressure. The amount the wall is elevated is self compensating. If the gap exceeds a given amount the air will escape faster thereby causing a greater pressure differential between the air supply and the air chamber at the base of the wall. Conversely, as the gap is decreased the air volume flow tends to decrease, thereby tending to decrease the pressure differential between that of the air pressure source and the chamber at the base of the wall. This higher pressure in the chamber at the base of the wall will therefore exert a greater lifting force which tends to elevate the curtain wall until a force balance is re-established.

As may be readily seen the assembly is supported completely by a fluid film which is nearly frictionless.

These and other objects and features of this invention will be better understood upon consideration of the following detailed description and the accompanying drawings in which:

FIGURE 1 is a cross-sectional view of the pallet/curtain wall assembly.

FIGURE 2 is a perspective view of the pallet/curtain-wall assembly.

FIGURE 3 is a side view of the pallet.

FIGURE 4 is a skeleton side view of the curtain wall.

FIGURE 5 is a cross-sectional view of one means of controlling the relative movement between the curtain wall and buoyant pallet.

FIGURE 6 is a cross-sectional top view of the linkage means illustrated in FIGURE 5.

FIGURE 7 is a cross-sectional view of the seal assembly at the base of the curtain-wall.

Figure 8:
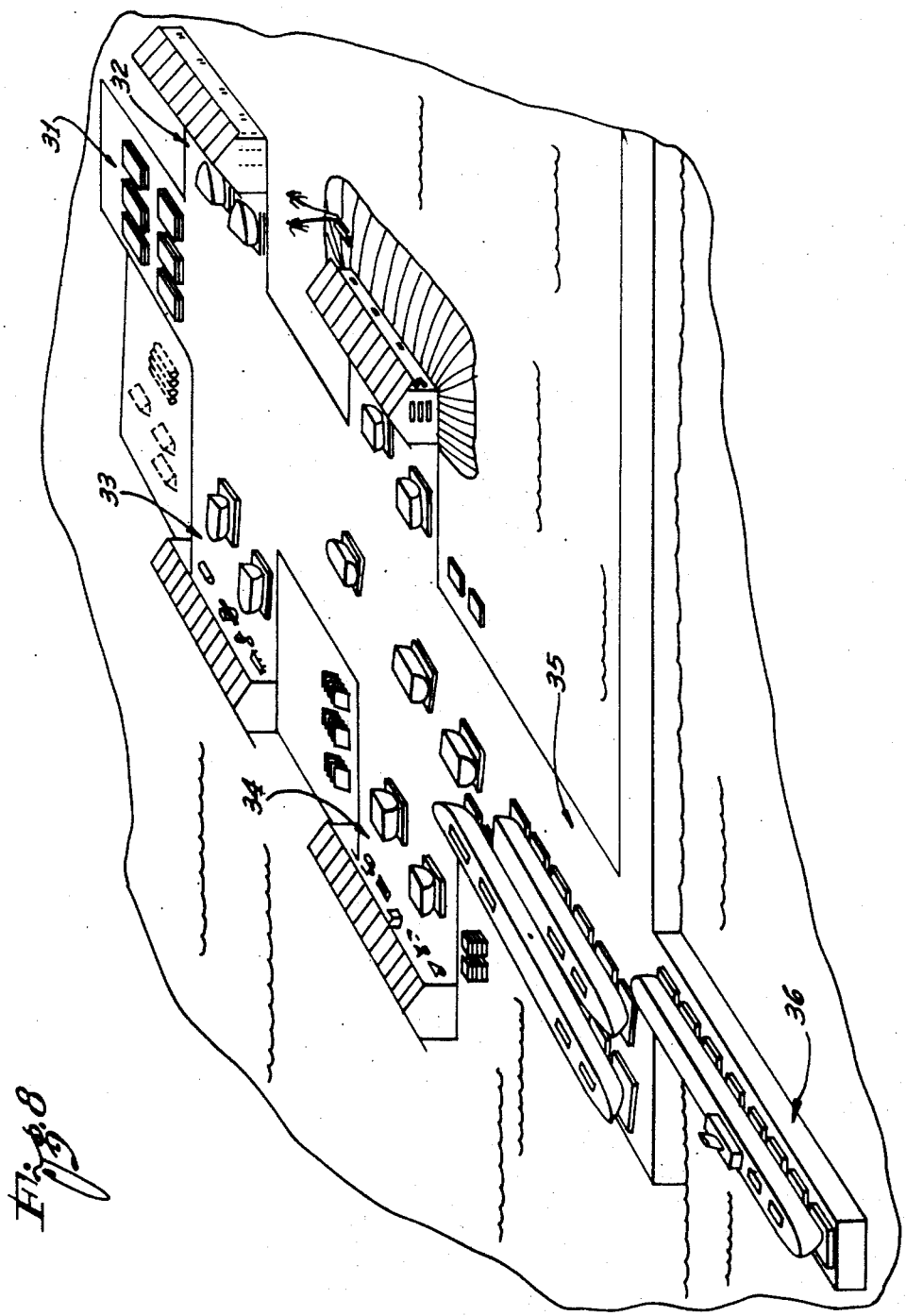
FIGURE 8 is a perspective view of the pallets being used in ship construction.

Referring now to FIGURE 1, a curtain-wall 13 is placed around a buoyant pallet 12 on a supporting surface 11. The gap between the curtain wall 13 and the buoyant pallet 12 is filled with water 14, which causes the buoyant pallet 12 to float. The curtain wall 13 is then elevated slightly by the introduction of air under pressure from the air pressure source 15 acting at the curtain wall base 16. This air pressure, in combination with a valve and seal assembly (described in detail infra), prevents the water 14 from escaping from the gap created as the curtain wall is elevated. The entire assembly including the curtain wall 13, buoyant pallet 12, and supported object 22 then floats on a fluid film which is nearly frictionless and may be moved over the supporting surface 11 with a minimum of power.

FIGURE 2 is a perspective view of the assembly whose cross-sectional view is illustrated in FIGURE 1. The curtain wall 13 completely surrounds the buoyant pallet 12. The supporting surface 11 is a relatively smooth and nonporous surface such as concrete or plastic.

FIGURE 3 is a cross-sectional view of the buoyant pallet 12 along its length will be comparable to the mass It should be noted that the chambers 17 in the pallet 12 may be flooded so that the net lifting force of the buoyant pallet 12 along its length will be comparable to the mass distribution of the supported object 22. When there is a concentrated mass such as a power unit 26 in the supported object 22, the floodable chamber 17 directly below the concentrated mass would carry less ballast 29, so that the lifting forces would be equal to the weight distribution, and thus no bending forces would be generated as the buoyant pallet 12 and supported object 22 are floated inside of the curtain wall 13.

FIGURE 4 is a cross-sectional view of the curtain wall 13 along section line 4 as indicated in FIGURE 2. The curtain wall 13 is constructed with an air pressure conduit 23 along its length. Air pressure is maintained in the conduit 23, from an external air pressure source 15. There are a number of orifices 18 distributed along the length of the conduit 23. The orifices 18, open into air chambers 25 at the curtain wall base 16. When it is desired to elevate the curtain wall 13, air pressure from the source 15 is introduced into the conduit 23. Before the curtain wall 13 rises, the curtain wall base 16 will form an airtight seal with the supporting surface 11. The volume flow will therefore be zero, and the pressure in the air chamber 25 will be equal to the pressure in the conduit 23. When the vertical force due to the air pressure in chamber 25 exceeds the weight of the curtain wall 13, the curtain wall will tend to rise. As soon as the curtain wall 13 starts to rise, air will start to escape from the gap created between the curtain wall base 16 and the supporting surface 11. This volume flow will result in a pressure drop across the orifice 18. The pressure in the air chamber 25 at the curtain wall base 16 is then less than that in the air pressure conduit 23. The curtain wall 13 will rise until an equilibrium point is reached. Equilibrium is attained when the pressure in the air chamber is just adequate to support the curtain wall 13. In a properly designed system the gap between the curtain wall base 16 and the supporting surface 11 would be on the order of a few hundredths of an inch when it is in equilibrium. Each cell 25 over the length of the curtain wall base 16 will tend to maintain a uniform clearance.

FIGURE 5 is a cross-sectional view of one possible means of providing lateral connection between the buoyant pallet 12 and the curtain wall 13.

The bearing track 21 is attached to the side of the buoyant pallet 12 in a vertical plane. The bearing support 20 is attached to the curtain wall 13 in a vertical plane parallel and adjacent to the bearing track 21. The roller bearing 19 is secured to the bearing support 20 in such a manner that it will freely roll along the bearing track 21 when there is relative vertical movement between the buoyant pallet 12, and the curtain wall 13. The bearing assembly will restrain relative lateral movement between the buoyant pallet 12, and the curtain wall 13.

FIGURE 6 is a cross-sectional view of the lateral restraint assembly along section line 6 as indicated in FIGURE 5.

In FIGURE 6 it is shown that the bearing support 20 is attached to the curtain wall 13, and that the bearing track 21 is attached to the buoyant pallet 12. The roller bearing 19 is attached to the bearing support 20 and is positioned so that it contacts the inside flange of the bearing track 21. This maintains a constant clearance between the buoyant pallet 12, and the curtain wall 13.

FIGURE 7 illustrates one possible embodiment of the curtain wall base 16. When it is desired to elevate the curtain wall 13 so that the entire curtain-wall/buoyant pallet assembly may be moved, air pressure from the air pressure source 15 is introduced into the air pressure conduit 23. The air will tend to escape from the air pressure conduit 23 into the flexible seal 24. The flexible seal is cylindrical in shape and completely encloses the air pressure conduit 23. The flexible seal will tend to maintain a circular cross-section due to the positive pressure against the inner wall of the flexible seal 24. The pressure inside the flexible seal 24 will tend to escape from the flexible seal 24 through the orifices 30 located along the wall of the flexible seal 24. When the system is in equilibrium the pressure in the air chamber 25 will be slightly higher than the water 14 pressure at the base of the curtain wall 13 which will prevent the water 14 from escaping at the base of the curtain wall 13. Since the pressure in the air chamber 25 is higher than that due to the water pressure a small amount of air will push through under the seal. This will result in the seal 24 being completely supported on a fluid film, and therefore free to move with minimum horizontal forces.

FIGURE 8 is a perspective view of the flotation pallets being used in ship construction. Empty pallets are stored in the pallet storage area 31. When the necessary components are available to construct one of the modules, an empty pallet is moved from the pallet storage area 31 to the appropriate assembly area 32-34. In each of these construction areas several identical modules may be constructed simultaneously. It will be noted that this type of construction permits many efficiencies not obtainable in conventional ship construction. Alternate work crews are able to work on different modules thereby avoiding the interference between the crews which is ordinarily encountered. It is also beneficial to be able to store the component parts adjacent the assembly area. In conventional shipyards it becomes impractical to store the parts adjacent to the assembly area since the majority of the assembly is accomplished in a relatively small area.

Since the ship is constructed of modules which are available at random due to the mobility provided by the pallets, a production problem with one of the modules will not impede completion of the ship. If, for example, one of the modules was damaged by fire, one of the other modules under construction could be used in its place.

This greatly improved method of ship construction would not be practical without the use of the mobile pallet.

In order to facilitate the practice of the invention certain design values will now be given.

Obviously the invention may be embodied in specifically different forms so that the values given are not to be construed in a limiting sense.

A 3000 ton ship module can be transported by a buoyant pallet 150 feet square. The buoyant pallet would be approximately 8 feet in depth. The water pressure on the supporting surface would be approximately 2.8 pounds per square inch. In a practical application the energy requirement of the curtain wall will depend on the characteristics of the supporting surface and the compliant feature of the seal at the base of the curtain wall. Assume that the hydro-pallet is operating on smooth concrete and 50% of the perimeter of the seal is in slight contact with the supporting surface and the remaining perimeter has an average air gap of one-hundredth of an inch. Then, less than 200 horsepower would be required to operate a floating pallet carrying a 3000 ton load.

From the foregoing description it is obvious that other liquids may be used to float the pallet, other fluids may be used to float the curtain wall. The pressure at the base of the pallet may be generated by a pump rather than by static pressure due to the water depth between the curtain wall and the pallet. Other kinds of seals may be used at the base of the curtain wall. Other means of balancing the buoyant pallet and the curtain wall may be used.

What is claimed is:

1. An apparatus for positioning an object relative to a surface comprising:

wall means engageable with said surface to form a substantially fluid tight container;

a first fluid within said container, a platform for supporting said object floatable in said first fluid, lateral restraining means having one portion connected to said wall means and another portion connected to said platform to permit relative vertical movement therebetween but restraining relative lateral movement therebetween;

means for raising said wall means away from said surface on a layer of a second fluid and preventing the escape of said first fluid from said wall means; thereby enabling said wall, platform, and object to be easily positionable laterally over said surface on layers of said first and second fluids.

2. The apparatus of claim 1, wherein said last mentioned means includes a pressure producing means for said second fluid cooperating with said wall means to develop a pressure sufficient to move said wall means away from said surface while maintaining said first fluid in said container.

3. As in claim 2, wherein the pressure means comprises a static pressure head generated by the fluid depth adjacent the platform.

4. The apparatus of claim 1, wherein the platform is a pallet having a plurality of compartments each capable of containing a quantity of ballast so that the orientation of the pallet can be compensated for objects having unequally distributed weight.

5. The apparatus of claim 1, wherein the wall means comprises a curtain wall which extends from the supporting surface vertically around the perimeter of the platform and having a seal at its base, said curtain wall being of sufficient height to retain said first fluid of sufficient depth to buoyantly support the platform.

6. The apparatus of claim 5, wherein the seal at the base of the curtain wall operates on the ground effects principle by said second fluid so that said wall is floated on the second fluid layer and is self-leveling.

7. The apparatus of claim 6, wherein the curtain wall is divided into at least two cells so that failure of one cell will not disable the entire apparatus.

8. The apparatus of claim 6, wherein the seal at the base of the curtain wall is flexible and inflated to enable it to conform to the contour of the supporting surface, and the ground effects principle is used to supply the force required to deflect the seal to conform to the supporting surface while maintaining a fluid-tight seal.

References Cited

UNITED STATES PATENTS

| 242,668 | 6/1881 | Male. |
| 1,000,152 | 8/1911 | Correll. |
| 3,055,446 | 9/1962 | Vaughen _____ 180—127 X |
| 3,124,209 | 3/1964 | Flipse _____ 180—121 |
| 3,228,294 | 1/1966 | Hickman _____ 180—116 X |
| 3,232,366 | 2/1966 | Cockerell _____ 180—124 |

FOREIGN PATENTS

| 893,715 | 4/1962 | Great Britain. |

A. HARRY LEVY, Primary Examiner

U.S. Cl. X.R.

114—45, 125